(12) United States Patent
Bassompiere et al.

(10) Patent No.: US 7,583,628 B2
(45) Date of Patent: Sep. 1, 2009

(54) DATA TRANSMISSION METHOD IN A CELLULAR COMMUNICATION NETWORK, CORRESPONDING SYSTEM, TERMINAL AND BASE STATION

(75) Inventors: Antoine Bassompiere, Paris (FR); Nathalie Goudard, Courbevoie (FR)

(73) Assignee: Wavecom, Issy-les-Moulineaux Cedex (FR)

( * ) Notice: Subject to any disclaimer, the term of this patent is extended or adjusted under 35 U.S.C. 154(b) by 602 days.

(21) Appl. No.: 10/500,257

(22) PCT Filed: Dec. 23, 2002

(86) PCT No.: PCT/FR02/04542

§ 371 (c)(1),
(2), (4) Date: Jan. 7, 2005

(87) PCT Pub. No.: WO03/056860

PCT Pub. Date: Jul. 10, 2003

(65) Prior Publication Data
US 2005/0123062 A1 Jun. 9, 2005

(30) Foreign Application Priority Data
Dec. 28, 2001 (FR) .................................. 01 17056

(51) Int. Cl.
*H04L 27/04* (2006.01)

(52) U.S. Cl. ...................................... 370/328; 375/295
(58) Field of Classification Search ................. 455/517, 455/522, 524, 68, 69; 370/328, 332, 343, 370/430; 375/295
See application file for complete search history.

(56) References Cited

U.S. PATENT DOCUMENTS

| 5,446,756 A | 8/1995 | Mallinckrodt ............... 375/200 |
| 2002/0145968 A1* | 10/2002 | Zhang et al. ................ 370/206 |
| 2004/0132477 A1* | 7/2004 | Lundby et al. .............. 455/522 |

FOREIGN PATENT DOCUMENTS

| EP | 1 098 456 A2 | 9/2001 |
| FR | 2 777 407 | 10/1999 |
| WO | WO 01 58189 A | 8/2001 |

* cited by examiner

*Primary Examiner*—Sam Bhattacharya
(74) *Attorney, Agent, or Firm*—Westman, Champlin & Kelly, P.A.

(57) ABSTRACT

A cellular communication system is provided comprising a terminal, a base station (for example UMTS) and a communication equipment designed to transmit data to a terminal and which is not provided with an uplink channel (for example using an OFDM technique). By transmitting via the TCP channel data other than those for controlling the power of the receiver base station, the terminal can control the power of the OFDM system transmitting high speed data to the terminal, the OFDM system being coupled to the UMTS network with which the terminal communicates.

18 Claims, 5 Drawing Sheets

DATA TRANSMISSION METHOD IN A CELLULAR COMMUNICATION NETWORK, CORRESPONDING SYSTEM, TERMINAL AND BASE STATION

CROSS-REFERENCE TO RELATED APPLICATION

This Application is a Section 371 National Stage Application of International Application No. PCT/FR02/04542, filed 23 Dec. 2002 and published as WO 03/056860 on 10 Jul. 2003, not in English, which is based on French Application No. 01 17056, filed 28 Dec. 2001, the contents of which is hereby incorporated by reference in its entirety.

FIELD OF INVENTION

This invention relates to the field of radio communications. More precisely, the invention relates to data transmission and processing, for example in a cellular network, particularly high-speed transmissions.

BACKGROUND OF THE INVENTION

Third generation and more recent radiotelephony systems already handle or will handle many services and applications requiring very high-speed data transmissions. Resources allocated to data transfers (for example files containing sound, and/or fixed or animated images), particularly through the Internet or similar networks, will account for an overwhelming part of the available resource and will probably eventually exceed resources allocated to voice communications which should remain approximately constant.

However, the total throughput available to radiotelephony equipment users is limited by the number of available frequencies. One particular method traditionally used to enable sufficient availability of resources is to increase the density of cells in a given territory. The result is thus a network infrastructure divided into "micro-cells" that are relatively small cells. One disadvantage of such a technique is that it requires a large number of fixed stations (base station (BS)), that are relatively complex and expensive elements. Furthermore, although the possible data throughput is high, it is not optimum. Furthermore, at a higher level, it is clear that management becomes more complex as the number of cells, and therefore the number of stations becomes larger.

The capacity of third generation UMTS (Universal Mobile Telecommunication System) networks is also limited by interference between adjacent cells or networks. Thus, base stations use a transmission power control making use of indications issued by a reception equipment, to avoid excessive interference.

Moreover, like all existing radiotelephony systems, third generation systems currently under development are based on an asymmetric structure. Thus, the UMTS standard defined by the 3GPP (Third generation Partnership Project) uses a symmetric distribution for the FDD (Frequency Division Duplex) main link, between the downlink channel (base station to terminal) and the uplink channel (terminal to base station). There is also a TDD (Time Division Duplex) link enabling some asymmetry. However, the asymmetry thus available is limited considering the needs of users for Internet type high-speed services, with or without mobility, on the downlink channel.

One solution then consists of using multi-carrier modulations with the W-CDMA (Wide-Code Division Multiple Access). For example, an OFDM (Orthogonal Frequency Division Multiplexing) downlink channel could be introduced, with a high speed (as described particularly in patent FR-98 04883 filed on Apr. 10 1998 by the Wavecom Company) or a UMTS network could be combined with existing or future high-speed wireless LANs (WLAN—Wireless Local Area Network) (particularly according to the ETSI Hiper-LAN/2 or IEEE 802.11 standards).

As for a system using CDMA, the same frequency may be used more than once for a system based on an OFDM modulation. Thus, if two adjacent cells use the same frequency (particularly when a resource is available in limited frequency), there would be interference between cells; thus, a terminal located in one cell at a frequency f1 will be disturbed by signals transmitted on an adjacent cell at the same frequency f1. The terminal will then receive delayed OFDM signals originating from two base stations. Orthogonality between OFDM sub-carriers is then no longer guaranteed, the terminal will no longer be capable of correctly demodulating the information to be sent to it.

In HiperLAN/2 type high-speed wireless networks (which particularly use an OFDM type modulation), there are more than twenty channels, so that a dynamic frequency allocation mechanism can be used to avoid having adjacent cells with the same frequency. However, this technique has the disadvantage that it is relatively complex to implement.

The invention and its various aspects are intended particularly to overcome the disadvantages of prior art.

More precisely, a first purpose of the invention is to optimise data transmission particularly by enabling a global increase in speed in one or several networks covering the same geographic area or adjacent areas.

A second purpose of the invention is to optimise data transfer from a terminal to a base station that does not necessarily have an uplink channel.

SUMMARY OF THE INVENTION

Consequently, the invention proposes a data transmission method in a radio communication network comprising:
at least one base station; and
at least one terminal adapted to individually and periodically transmitting binary information on an uplink radio channel (TPC) to at least one base station called the first base station, remarkable in that the radio channel carries:
first information for controlling the transmission power from the first base station; and
second information intended for a purpose other than controlling the power from the first base station.

According to one particular characteristic, the method is remarkable in that the first base station manages at least one mobile telecommunication network cell.

Thus, the invention can be used in mobile telecommunication networks such as the UMTS network without any significant change to existing standard specifications.

According to one particular characteristic, the method is remarkable in that the first base station sends at least one part of the received second information to communication equipment capable of transmitting data to the terminal, and in that the communication terminal processes at least one part of the second information.

According to one particular characteristic, the method is remarkable in that when the communication equipment is in communication with the terminal, it adjusts the radio transmission power used to send data to the terminal as a function of the result of the processing.

According to one particular characteristic, the method is remarkable in that the communication equipment communicates with the terminal on a single directional channel used to transmit data from the communication equipment to the terminal.

According to one particular characteristic, the method is remarkable in that the communication equipment is adapted to sending data using a multiple carrier modulation (OFDM).

According to one particular characteristic, the method is remarkable in that the communication equipment supports communications according to a protocol compatible with the HIPERLAN/2 standard and/or the IEEE 802.11 standard.

According to one particular characteristic, the method is remarkable in that the equipment is a base station separate from the first base station.

According to one particular characteristic, the method is remarkable in that the equipment is a terminal.

Thus, the invention may be applied in the case in which the communication equipment does not have an uplink channel, for example this equipment being a second base station in a UMTS, HIPERLAN, IEEE 802.11 network (particularly IEEE 802.11a or 802.11b) or in any other network, a terminal (for example used for direct transmission to another terminal or as a relay) or more generally to a third party equipment that will transmit data to the terminal.

According to one particular characteristic, the method is remarkable in that the other purpose includes control over the transmission power from a base station distinct from the first base station.

According to one particular characteristic, the method is remarkable in that the other purpose includes acknowledgement of data transmitted by a base station to the terminal on a radio channel, the acknowledgement indicating whether or not data were correctly received by the terminal.

Thus, the invention enables an acknowledgement that data were received correctly and/or a negative acknowledgement showing that the data were not received correctly.

According to one particular characteristic, the method is remarkable in that the other purpose is one of the purposes in the following group:
  data transmissions to a base station distinct from the first base station;
  management of time slaving between a base station and the terminal;
  management of frequency slaving between a base station and the terminal; and
  control of the data flow sent to and/or from the terminal.

Thus, there are many possible uses of the invention, and particularly:
  control of the transmission power from a second base station to limit interference;
  acknowledgement of frames sent by the base station receiving the signal from the uplink channel (TPC) or by another base station so that the station transmitting the data can react very quickly;
  management of time and/or frequency slaving in order to efficiently, reliably and quickly compensate for time and/or frequency variations on radio links.

Thus, these uses make use of the very reactive nature of the TPC channel that enables data transmission on an uplink channel within very short periods.

According to one particular characteristic, the method is remarkable in that the position of the first and second information is predetermined.

Thus, it is very easy to implement the invention.

According to one particular characteristic, the method is remarkable in that the position of the first and second information is determined dynamically.

In this manner, while maintaining simple implementation, the invention adapts the number and position of the first and second information as a function of constraints related to control of the power of the uplink channel receiving station and needs related to other end purposes obtained due to the second information.

According to one particular characteristic, the method is remarkable in that the second information represents not more than 10% of the elementary information.

According to one particular characteristic, the method is remarkable in that the second information represents not more than 1% of the elementary information.

Thus, the invention provides a means of maintaining good performances for controlling the power output from the station receiving data on the TPC channel, while enabling reliable transmission of the second information, within short periods.

The invention also relates to a terminal adapted to individually and periodically transmitting binary information on an uplink radio channel (TPC) to a base station in a radio communication network called the first base station, remarkable in that it includes means of distinguishing and inserting the following elementary items of information:
  first information for controlling the transmission power output from the first base station; and
  second information to be used for a purpose other than controlling the power output from the first base station.

The invention also relates to a base station in a cellular network, adapted to individually and periodically receiving binary information on an uplink radio channel (TPC) from a terminal, remarkable in that it includes means of distinguishing and extracting the following elementary items of information:
  first information for controlling the transmission power output from the first base station; and
  second information to be used for a purpose other than controlling the power output from the first base station.

The invention also relates to a communication system, remarkable in that it includes at least one terminal and at least one base station like those described above.

The invention also relates to a signal transmitted by a terminal to a base station in a radio communication network and carrying binary information transmitted individually and periodically by the terminal to the base station on an uplink radio channel (TPC), remarkable in that the binary information includes:
  first information for controlling the transmission power output from the first base station; and
  second information to be used for a purpose other than controlling the power output from the first base station.

The advantages of the terminal, the network base station, the system and the signal are the same as the advantages of the data transmission method, and they are not described in more detail.

BRIEF DESCRIPTION OF THE DRAWINGS

Other characteristics and advantages of the invention will become clearer after reading the following description of a preferred embodiment given as a simple illustrative and non-limitative example, and the attached drawings.

DETAILED DESCRIPTION OF THE PREFERRED EMBODIMENTS

Figure 1:
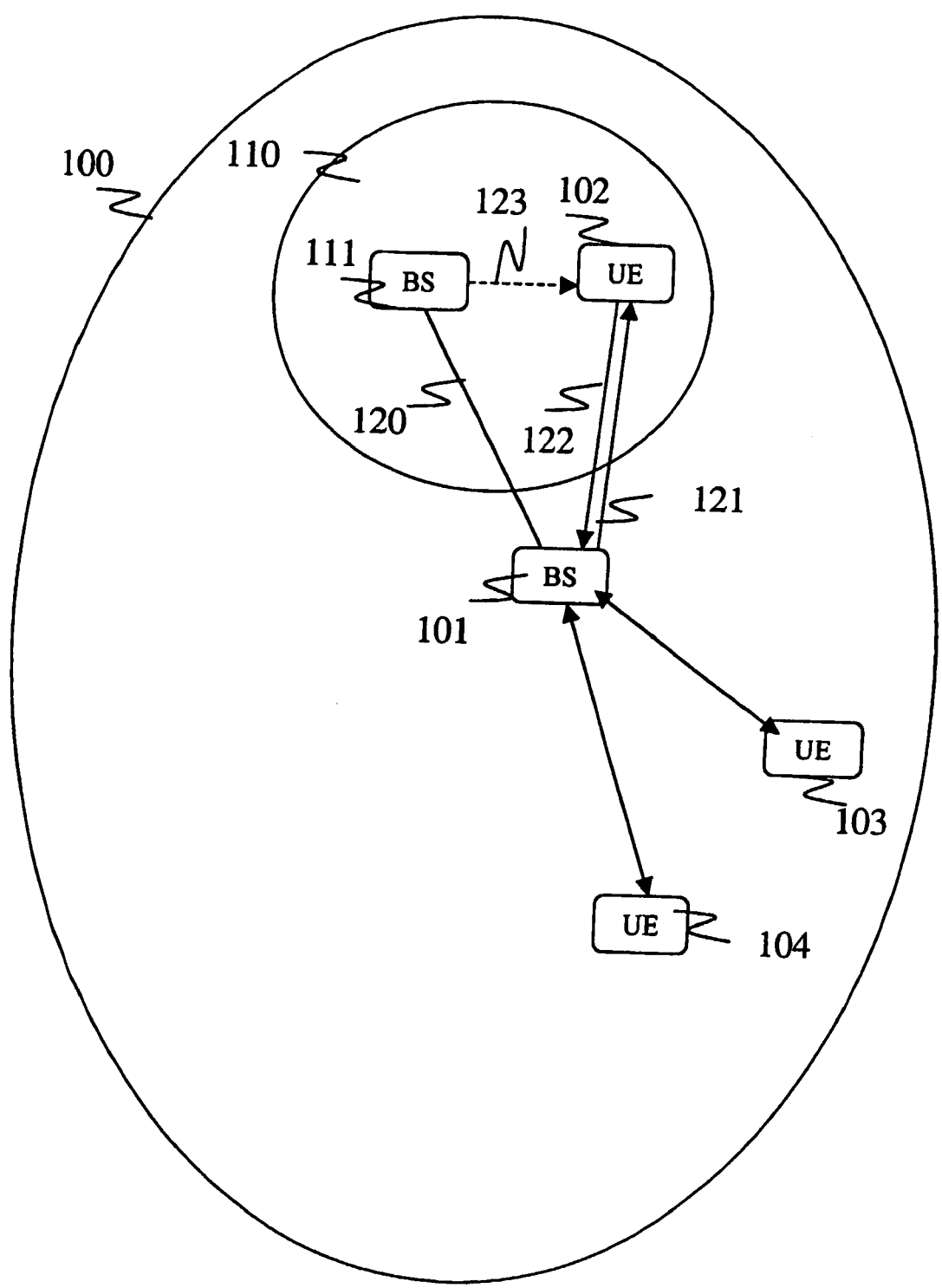
FIG. 1 shows a block diagram of the network according to a particular embodiment of the invention.

The general principle of the invention consists of using a physical channel dedicated to periodic transmission of isolated binary data to transmit data designed to control the power of the receiver base station and another purpose.

According to known techniques used in the UMTS standard, a mobile sends power control information on a particular channel called the TPC, 1500 times per second, so that the associated base station can increase or reduce its transmission power.

According to the invention, some bits of the TPC channel (typically 1% and preferably less than 10% of the total number of bits) are used for a purpose other than controlling the transmission power from the base station receiving this signal. Thus, the UMTS system is then only very slightly degraded since there are typically 1485 bits (and preferably 1350 bits) per second remaining.

According to one known technique (used particularly in the UMTS standard) called the compressed mode technique, inactivity periods (or gaps) cause the deletion of a large number of bits dedicated to controlling the power from a base station. In this case, the impact of the use of compressed mode on the UMTS system still remains tolerable.

According to the invention, the performances of controlling the power of the receiver base station receiving the corresponding signal, would only be very slightly degraded or possibly not degraded at all by deleting some bits.

Data transmission by a terminal to a base station on a TPC type radio channel used to individually and periodically transmit binary data, including data designed to control the power from the reception base station and data designed to another purpose, may have useful applications, for example:

control of the power of at least one other station without a TPC type uplink channel; and acknowledgment of data transmitted by the receiver base station of the TPC channel or another base station and/or terminal.

Thus, when transmitting data other than data intended for use in controlling the power from the receiving base station through the TPC channel, a terminal can for example control the power of an OFDM based system transmitting data at high-speed to the terminal, the OFDM system being coupled to a UMTS network with which the terminal is communicating. The frequency at which the power of the OFDM based system is controlled will be adapted so that it only slightly penalises control of the power from the receiving base station, or does not penalise it at all.

Thus, to limit interference, the power of OFDM signals transmitted is controlled by using the UMTS power control mechanism (W-CDMA). Thus, the power of signals transmitted for terminals close to an OFDM base station will be lower than the power of signals transmitted for terminals further from the OFDM base station. The innovation of the invention is then based on the use of the power control mechanism of the UMTS to control the power of OFDM transmitted signals.

Moreover, due to this transmission power control, if there are any overlaps of cells with the same frequency, the size of the overlap should be smaller since base stations will not transmit any unnecessary energy. Therefore, the invention also limits inter-cell interference for this specific case (terminal in an area in which cells at the same frequency are overlapping).

Moreover, the invention has the advantage of keeping the existing UMTS protocol interface, since bits on the TPC channel only pass between physical layers. The DPCCH uplink channel type physical channel that carries the TPC channel is not modified.

We will present a block diagram of a mobile radiotelephony network using the invention, with relation to FIG. 1.

For example, the network may be compatible with the UMTS (Universal Mobile Telecommunication System) standard defined by the 3GPP committee.

The network includes a cell 100 (or macro-cell) managed by a base station 101 (BS) using the UMTS standard.

The base station 101 manages communications from terminals 103, 104 and 104 adapted to communicating with the base station 101 through two-directional radio links.

Thus, the terminal 102 is connected to the base station 101 through an uplink channel 122 and a downlink channel 121.

Moreover, the cell 100 encompasses an HIPERLAN/2 type network 110 used for high-speed transfers.

The cell 100 particularly includes a base station 111 compatible with the HIPERLAN/2 standard which is connected in communication through a single directional high-speed radio down link 123, to terminal 102.

The base station 111 is also connected through any two-directional link 120, for example a wire link, to the base station 101.

Note that when terminals 102 to 104 is not in communication, it is in standby mode, in other words in a mode in which the terminal is not in communication mode but is present and available in the cell 100 for a communication. In particular, these terminals are used for listening to signals transmitted by the base station 101 belonging to the cell 100.

These signals are transmitted on:

common transport channels corresponding to services offered to high layers of the communication protocol, particularly BCH channels (Broadcast Channels) and PCH (Paging Channels); and common transport channels corresponding to the physical layer of the communication protocol, particularly on CPICH channels (Common PIlot CHannels).

The channels used by 3GPP networks are well known to a person skilled in the art of mobile networks and are specified in particular in the "3$^{rd}$ Generation Partnership Project; Technical Specification Group Radio Access Network; Physical Channels and mapping of transport channels onto physical channels (FDD) release 1999" standard, reference 3GPP TS25.211 and distributed by the 3GPP publication office. Therefore, these channels are not described in more detail.

Figure 2:
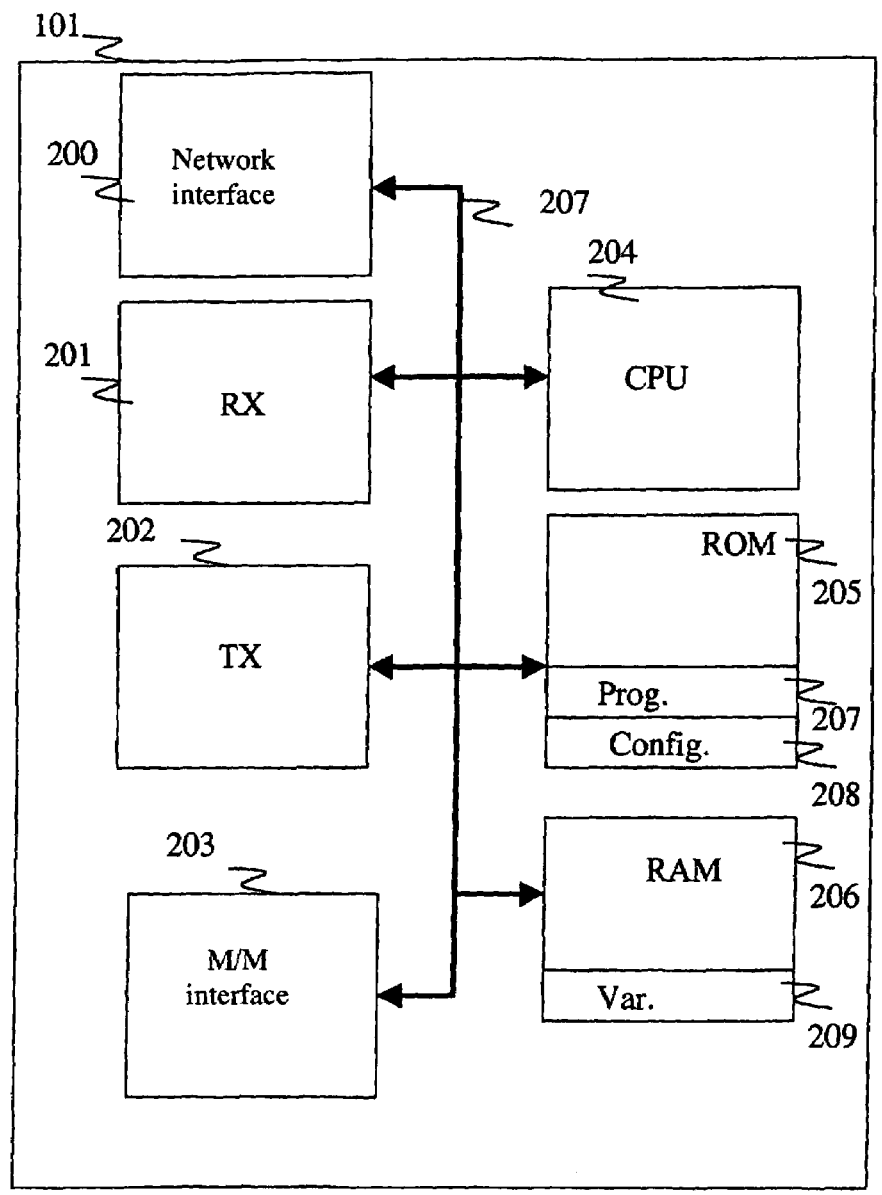
FIG. 2 describes a base station in the network shown in FIG. 1.

FIG. 2 diagrammatically shows the base station 101 as illustrated with reference to FIG. 1.

The base station 101 includes the following connected to each other through an address and data bus 207:

a processor 204;

a RAM 206;

a non-volatile memory 205;

a wired network interface 200 enabling a connection to a fixed infrastructure in the mobile network or to other networks (particularly link 120 to the base station 111 in network 110);

a reception radio interface 201 for receiving signals transmitted by terminal (particularly terminal 102 to 104) present in the cell 100;

a radio transmission interface 202 for sending signals to terminal present in the cell 100, and a man-machine interface 203 for dialogue with the machine for control and maintenance.

The RAM 206 stores data, variables 209 and intermediate processing results.

The non-volatile memory 205 keeps the following in registers, which are assigned the same name as the data stored in them for convenience:

the operating program of the processor 204 in a "prog" register 210, configuration parameters 211 for the base station 101.

The base station 110 not shown, includes the following, connected to each other through an address and data bus:

a processor, a RAM, a non-volatile memory, a wired network interface enabling a connection to a fixed infrastructure in the mobile network or to other networks (particularly link 120 to the base station 101);

a radio transmission interface for sending signals to terminal present in the network 110 (particularly equipment 102); and a man-machine interface enabling a dialogue with the machine for control and maintenance.

Figure 3:
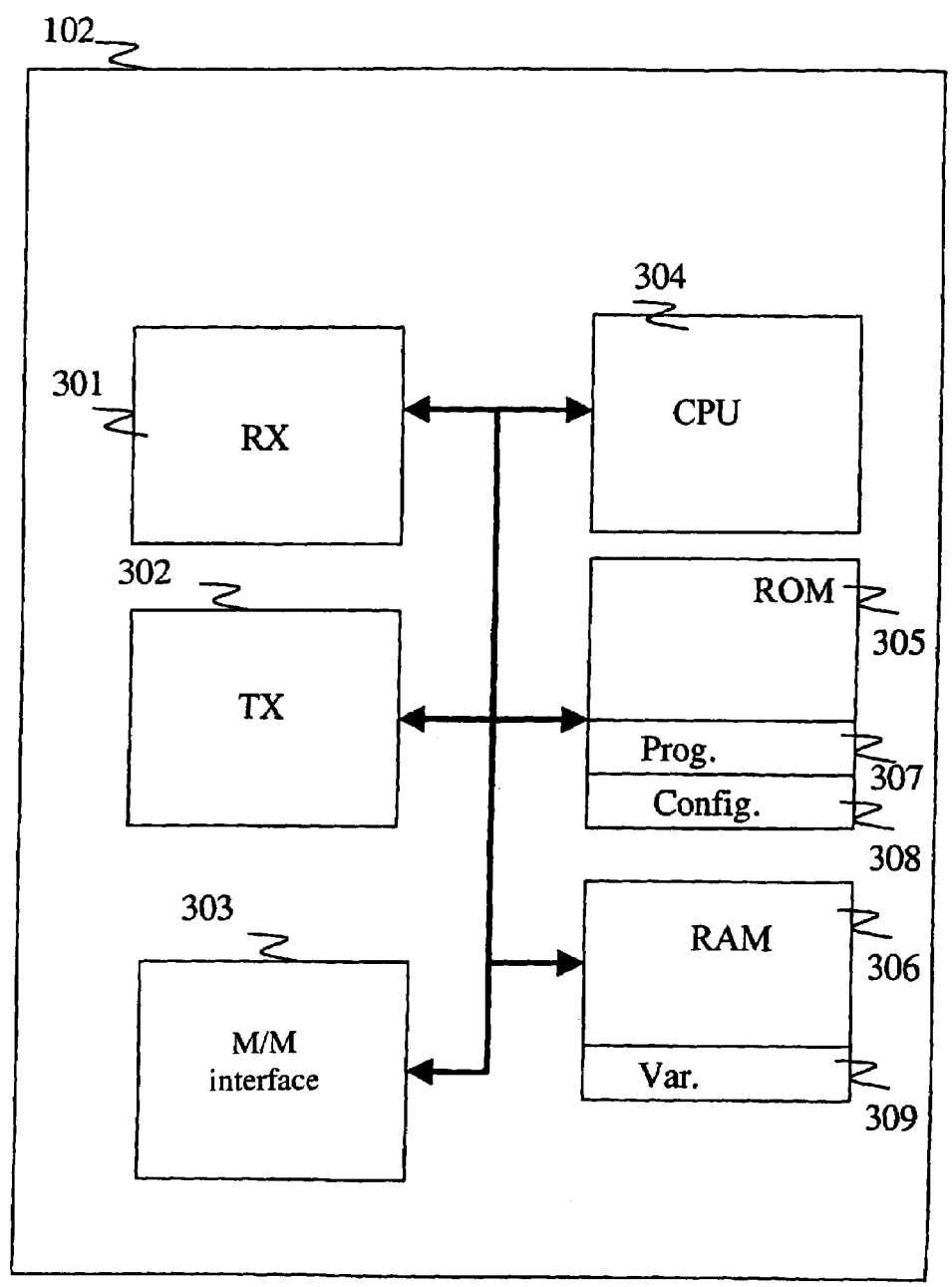
FIG. 3 describes a terminal in the network shown in FIG. 1.

FIG. 3 shows the terminal 102 as illustrated with reference to FIG. 1.

The terminal 102 includes the following connected to each other through an address and data bus 307:

a processor 304;

a RAM 306;

a non-volatile memory 305;

a reception radio interface 301 for receiving signals sent by the UMTS base station 101 and the HIPERLAN/2 base station 111;

a radio transmission interface 302 for sending signals to the UMTS base station 101; and a man-machine interface 303 for dialogue with the machine for control and maintenance.

The RAM memory 306 keeps data, variables 309 and intermediate processing results.

The non-volatile memory 305 keeps the following in registers, which are assigned the same name as the data stored in them for convenience:

the operating program of the processor 304 in a "prog" register 310, configuration parameters 311 for the terminal 102.

Figure 4:
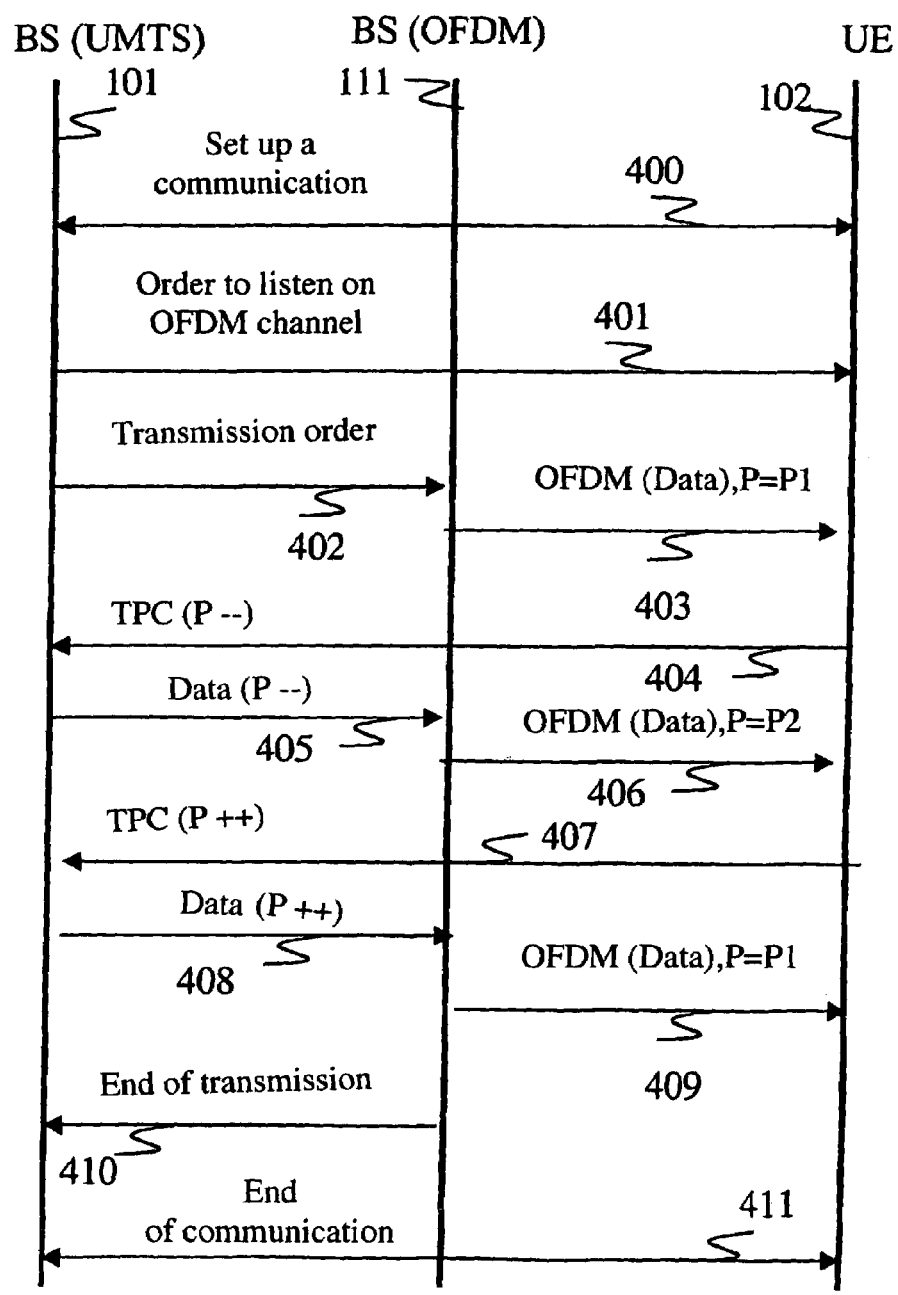
FIG. 4 shows a communication protocol between the different elements in the network in FIG. 1.

FIG. 4 shows a protocol for communication between base stations 101 and 111 and terminal 102.

During a first step 400, a communication is set up using the UMTS protocol between the base station 101 and the terminal 102 on the downlink channel 121 and the uplink channel 122.

The base station 101 then transmits an order 401 on the downlink channel 121 to the terminal 102, to listen on the OFDM channel specific to the base station 111, for example on a FACH (Forward Access CHannel) or a DCH (Dedicated Channel) or a DSCH (Downlink Shared channel) or through the TFCI (Transport Format Combination Indicator) field carried by the DPCCH (Dedicated Physical Control Channel).

The base station 101 then transmits an order to transmit data intended for terminal 103 to the base station 111 on its OFDM channel.

The base station 111 then transmits data for use by the terminal 103 on the downlink channel 123 using an OFDM modulation enabling high transmission speed at a power equal to an initial value P1.

Then, assuming that the terminal measures a received power that is too high (using known techniques), it informs the base station 101 in a step 404 that the base station 111 can reduce its transmission power. This information is transmitted through the TPC channel by inserting data designed to for a different purpose, namely for controlling the transmission power output from the base station 111 among the power control data for use by the base station 101.

Then, during a step 405, the base station 101 uses the wire link 120 to inform the base station 111 that it can reduce the transmission power associated with frames sent to the terminal 102.

Thus, the base station 111 adjusts its transmission power as a function of indications provided by the terminal 102 through the base station 101. The base station 111 then sends data 406 intended for the terminal 103 on the downlink channel 123 using an OFDM modulation enabling a high transmission speed at a power equal to a value equal to P2 less than the initial value P1. The base station thus transmits data designed to the terminal and limits interference created by this transmission.

Then, assuming that the terminal measures a received power that is too low (using known techniques), it informs the base station 101, as above through the TPC channel, in a step 407, that the base station 111 should increase its transmission power.

The base station 101 then informs the base station 111 that it must increase the transmission power associated with the frames addressed to terminal 102, through the wire link 120, during a step 408.

The base station 111 then sends data 409 designed to terminal 103 on the downlink channel 123 using an OFDM modulation enabling a high transmission speed at a power equal to P1, less than the previous value P2. The base station thus transmits data to the terminal optimising the transmission power such that the interference created by this transmission are limited while enabling good reception of data through terminal 102.

When the high-speed transmission is finished, the final step 410 is carried out in which the terminal 102 interrupts listening to the base station 111 and an exchange protocol 411 compatible with the UMTS standard is set up between the UMTS base station 101 and the terminal 102 to terminate the communication.

Figure 5:
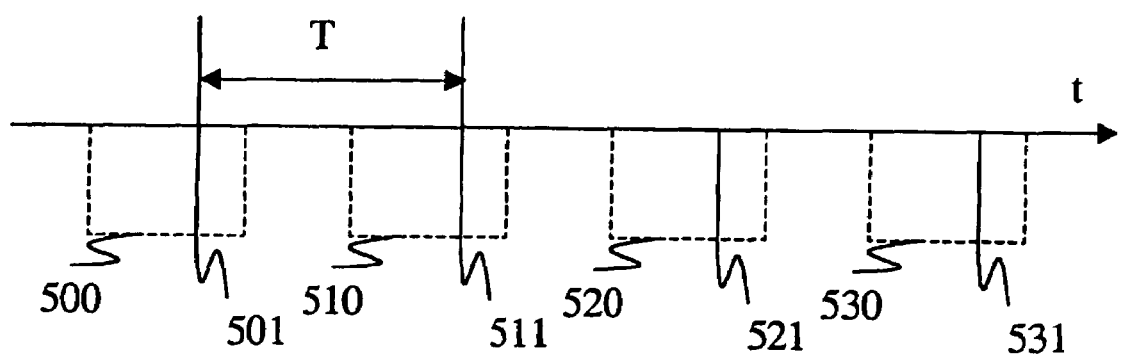
FIG. 5 presents a data transmission by the terminal in FIG. 3 to base stations in the network in FIG. 1.

FIG. 5 shows transmission of UMTS frames from the terminal 102 to the base station 101.

The terminal successively and periodically sends frames 500, 510, 520 and 530 to the base station 111.

These frames are used for the transmission of bits 501, 511, 521 and 531 on a TPC channel, at a period equal to T.

For example, bits 501, 521 and 531 are bits dedicated to controlling the transmission power of base station 101.

On the other hand, bit 511 is intended for another purpose, for example control of the transmission power of the base station 111. This bit may be identified by the base station 101 and processed in order to transmit information output from this processing to the base station 111, for example to request an increase or reduction in its transmission power.

In general, the positions of the bits in the TPC channel are determined in advance within each frame as a function of their use. Thus, the bits distribution is known to terminal 102 and to the base station 101, that can then insert and extract bits on the TPC channel as a function of their meaning.

According to one variant, the positions of bits designed to a purpose other than controlling the power of the base station 101 may be determined and allocated dynamically as a function of needs, using a protocol message transmitted by another transport channel.

Note that in all cases, the bits distribution within the TPC channel will be chosen such that the power control of the receiving base station is not degraded or is only degraded by a minimum amount. Thus, bits on the TPC channel intended for a different purpose will preferably be uniformly distributed in this channel, two consecutive bits of the TPC channel not being assigned to this other purpose.

Obviously, the invention is not limited to the example embodiments mentioned above.

In particular, a person skilled in the art could make any variant in the types of networks used. Thus, the invention relates to all mobile and/or radio cell networks, with an up link enabling a terminal to transmit a power control signal by periodically transmitting data including data specific to control the power of the station receiving the signal, and data designed to another purpose, for example data for use by third party equipment incapable of receiving data directly from the terminal. In particular, this third party equipment may be compatible with a HIPERLAN/2 or IEEE 802.11 type standard, or UMTS or any other standard used for high-speed data transfers. For example, it may be a base station, a relay station or a terminal equipment.

For example, data designed to a different purpose will include data for controlling the transmission power of the third party equipment, but also any other type of informative data. In particular, but not restrictively, the third party equipment may be adapted to transmitting high-speed data to a terminal equipment using a TPC channel connecting it to a radio network base station, for example the data being transmitted using an OFDM or IOTA type multi-carrier modulation (as defined in patent request FR-95 05455).

Note that the invention is not limited to a purely physical installation, but it can also be used in the form of a sequence of instructions in a computer program or in any form combining a hardware part and a software part. If the invention is used partially or completely in software form, the corresponding instruction sequence may be but is not necessarily stored on a removable storage means (for example such as a diskette, a CD-ROM or a DVD-ROM), this storage means being partially or completely readable by a computer or a microprocessor.

The invention claimed is:

1. Data transmission method in a radio communication network comprising:
    at least one base station; and
    at least one terminal adapted to individually and periodically transmit binary information on an uplink radio channel to at least one of the base stations called the first base station,
    wherein the method comprises:
    transmitting at least one bit, called first binary information through the radio channel for controlling transmission power of the first base station; and
    transmitting at least one bit, called second binary information through the radio channel designed to a purpose other than controlling the transmission power of the first base station,
    at least one of said first or second binary information being transmitted individually and periodically such that two consecutive binary information are never assigned to a purpose other than controlling the power of the first base station, and
    said second binary information being inserted among said first binary information.

2. Method according to claim 1, wherein the first base station manages at least one mobile telecommunication network cell.

3. Method according to claim 1, wherein the first base station sends at least one part of the received second binary information to a communication equipment capable of transmitting data to the terminal, and wherein the communication equipment processes the at least one part of the second binary information.

4. Method according to claim 3, wherein when the communication equipment is in communication with the terminal, it adjusts the data radio transmission power to be sent to the terminal as a function of the result of the processing.

5. Method according to claim 3, wherein the communication equipment communicates with the terminal on a single directional channel used to transmit data from the communication equipment to the terminal.

6. Method according to claim 3, wherein the communication equipment is adapted to sending data using a multiple carrier modulation.

7. Method according to claim 3, wherein the communication equipment supports communications according to a protocol compatible with the HIPERLAN/2 standard and/or the IEEE 802.11 standard.

8. Method according to claim 3, wherein the equipment is a base station distinct from the first base station.

9. Method according to claim 3, wherein the equipment is a terminal.

10. Method according to claim 1, wherein the other purpose comprises controlling the transmission power of a base station distinct from the first base station.

11. Method according to claim 1, wherein the other purpose includes acknowledgement of data transmitted by a base station to the terminal on a radio channel, the acknowledgement indicating whether or not data were correctly received by the terminal.

12. Method according to claim 1, wherein the other purpose is one of the purposes selected from the group consisting of:
    data transmissions to a base station distinct from the first base station;
    management of time slaving between a base station and the terminal;
    management of frequency slaving between a base station and the terminal; and
    control of the data flow sent to and/or from the terminal.

13. Method according to claim 1, wherein bit positions of the first and second binary information are predetermined.

14. Method according to claim 1, wherein bit positions of the first and second binary information are determined dynamically.

15. Method according to claim 1, wherein the second binary information represents not more than 10% of the elementary information.

16. Method according to claim 15, wherein the second binary information represents not more than 1% of the binary information.

17. Terminal adapted to individually and periodically transmit binary information on an uplink radio channel to a base station called the first base station in a radio communication network, wherein the terminal is adapted to:
    distinguish and insert among said binary information:
    at least one bit, called first binary information for controlling transmission power of the first base station; and
    at least one bit, called second binary information designed to a purpose other than the control of the power of the first base station, at least one of said first or second binary information being transmitted individually and periodically such that two consecutive binary information are never assigned to a purpose other than controlling the power of the first base station, and said second binary information being inserted among said first binary information.

18. A base station in a cellular network, adapted to individually and periodically receive binary information on an uplink radio channel from a terminal, wherein the base station is adapted to distinguish and extract among the said binary information:

at least one bit, called first binary information for controlling transmission power of the first base station; and at least one bit, called second binary information designed to a purpose other than controlling the power of the first base station, at least one of said first or second binary information being transmitted individually and periodically such that two consecutive binary information are never assigned to a purpose other than controlling the power of the first base station, and said second binary information being inserted among said first binary information.

* * * * *

UNITED STATES PATENT AND TRADEMARK OFFICE
CERTIFICATE OF CORRECTION

PATENT NO. : 7,583,628 B2
APPLICATION NO. : 10/500257
DATED : September 1, 2009
INVENTOR(S) : Antoine Bassompiere et al.

It is certified that error appears in the above-identified patent and that said Letters Patent is hereby corrected as shown below:

Column 10
Line 54, delete "elementary" and insert --binary--

Signed and Sealed this

Seventeenth Day of November, 2009

David J. Kappos
*Director of the United States Patent and Trademark Office*